US 12,095,553 B2

United States Patent
Taghizadeh Motlagh et al.

(10) Patent No.: US 12,095,553 B2
(45) Date of Patent: Sep. 17, 2024

(54) SENSING REFERENCE SIGNAL ADJUSTMENTS FOR USER EQUIPMENT PARTICIPATION

(71) Applicant: Lenovo (Singapore) Pte. Ltd., New Tech Park (SG)

(72) Inventors: Seyedomid Taghizadeh Motlagh, Oberursel (DE); Ali Ramadan Ali, Munich (DE); Ankit Bhamri, Rödermark (DE); Sher Ali Cheema, Ilmenau (DE); Razvan-Andrei Stoica, Essen (DE); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 295 days.

(21) Appl. No.: 17/538,950

(22) Filed: Nov. 30, 2021

(65) Prior Publication Data

US 2023/0171020 A1 Jun. 1, 2023

(51) Int. Cl.
*H04L 1/00* (2006.01)
*H04B 17/336* (2015.01)
*H04L 5/00* (2006.01)
*H04W 24/10* (2009.01)

(52) U.S. Cl.
CPC ......... *H04L 1/0025* (2013.01); *H04B 17/336* (2015.01); *H04L 5/0051* (2013.01); *H04W 24/10* (2013.01)

(58) Field of Classification Search
CPC ............................ H04L 1/0025; H04W 24/10
See application file for complete search history.

(56) References Cited

U.S. PATENT DOCUMENTS

2010/0322100 A1* 12/2010 Wan ..................... H04B 7/0413
370/252
2016/0212735 A1* 7/2016 Nogami ................ H04L 5/0048
(Continued)

OTHER PUBLICATIONS

M. Kiviranta et al., "5G Radar: Scenarios, Numerology and Simulations", 2019 International Conference on Military Communications and Information Systems (ICMCIS), May 1, 2019, Abstract p. 1.

(Continued)

*Primary Examiner* — Zhiren Qin
(74) *Attorney, Agent, or Firm* — Kunzler Bean & Adamson

(57) ABSTRACT

Apparatuses, methods, and systems are disclosed for sensing reference signal adjustments for user equipment participation. An apparatus includes a transceiver that transmits a radio sensing capability report to a network node of a mobile wireless communication network in response to a capability indication request configuration received from the network node. The transceiver receives, from the network node, configurations defining at least one sensing reference signal ("RS") pattern, a sensing task, and a sensing RS mode based on the radio sensing capability report. The apparatus includes a processor that executes, based on the configurations, one or more of the sensing task and interference management according to the sensing RS pattern and the sensing RS mode in response to the sensing task and the interference management being scheduled, respectively.

19 Claims, 7 Drawing Sheets

(56) References Cited

U.S. PATENT DOCUMENTS

| | | | |
|---|---|---|---|
| 2017/0230855 A1* | 8/2017 | Hu | H04W 24/10 |
| 2020/0146099 A1* | 5/2020 | Abedini | H04L 1/0003 |
| 2020/0305152 A1 | 9/2020 | Yasukawa et al. | |
| 2021/0076367 A1 | 3/2021 | Bayesteh et al. | |
| 2021/0385818 A1* | 12/2021 | Levitsky | H04W 72/569 |
| 2022/0026550 A1* | 1/2022 | Park | G01S 13/762 |
| 2022/0191819 A1* | 6/2022 | Ratasuk | H04W 8/12 |
| 2022/0386342 A1* | 12/2022 | Takeda | H04L 5/0048 |
| 2023/0116477 A1* | 4/2023 | Sengupta | H04W 4/06 370/329 |
| 2023/0147157 A1* | 5/2023 | Ibrahim | H04L 5/0073 370/329 |
| 2023/0160996 A1* | 5/2023 | Murakami | G01S 13/003 342/146 |

OTHER PUBLICATIONS

P. Kumari et al., "IEEE 802.11 ad-Based Radar: An Approach to Joint Vehicular Communication-Radar System", IEEE Transactions on Vehicular Technology, Nov. 17, 2017, pp. 1-35.

J. Fink et al., "Comparison of OFDM Radar and Chirp Sequence Radar", IEEE, 2015 16th International Radar Symposium (IRS), Aug. 27, 2015, pp. 1-6.

Jan Mietzner, "DFT-Spread OFDM MIMO-Radar—An Alternative for Reduced Crest Factors", IEEE, 2019 20th International Radar Symposium (IRS), Jul. 22, 2019, Abstract pp. 1-2.

C. G. Barneto et al., "Full-Duplex OFDM Radar With LTE and 5G NR Waveforms: Challenges, Solutions, and Measurements", IEEE, IEEE Transactions on Microwave Theory and Techniques, Aug. 19, 2019, pp. 1-13.

PCT/IB2022/061617, "Notification of Transmittal of the International Search Report and the Written Opinion of the International Searching Authority, or the Declaration", International Searching Authority, Feb. 28, 2023, pp. 1-13.

Rahman et al., "Enabling Joint Communication and Radio Sensing in Mobile Networks—A Survey", ARXIV.org, Cornell University Library, 201 Olin Library Cornell University Ithaca, NY 14853, Jun. 13, 2020, pp. 1-25.

3GPP, "3GPP based Wireless Sensing Services", 3GPP TSG-SA1 Meeting #96e S1-214101, Nov. 8-18, 2021, pp. 1-13.

* cited by examiner

12,095,553 B2

SENSING REFERENCE SIGNAL ADJUSTMENTS FOR USER EQUIPMENT PARTICIPATION

FIELD

The subject matter disclosed herein relates generally to wireless communications and more particularly relates to sensing reference signal adjustments for user equipment participation.

BACKGROUND

In wireless networks, radio sensing may be used for a mechanism to improve the network performance, as well as an enabler to serve vertical use-cases. In particular, radio sensing may obtain environment information by the means of transmission of a sensing excitation signal, reception of reflections/echoes of the transmitted sensing excitation signal from the environment, and processing of the received reflections and inferring relevant information from the environment.

BRIEF SUMMARY

Disclosed are procedures for sensing reference signal adjustments for user equipment participation. Said procedures may be implemented by apparatus, systems, methods, and/or computer program products.

In one embodiment, a first apparatus includes a transceiver that transmits a radio sensing capability report to a network node of a mobile wireless communication network in response to a capability indication request configuration received from the network node. In one embodiment, the transceiver receives, from the network node, configurations defining at least one sensing reference signal ("RS") pattern, a sensing task, and a sensing RS mode based on the radio sensing capability report. In one embodiment, the first apparatus includes a processor that executes, based on the configurations, one or more of the sensing task and interference management according to the sensing RS pattern and the sensing RS mode in response to the sensing task and the interference management being scheduled, respectively.

In one embodiment, a first method includes transmitting a radio sensing capability report to a network node of a mobile wireless communication network in response to a capability indication request configuration received from the network node. In one embodiment, the first method includes receiving, from the network node, configurations defining at least one sensing reference signal ("RS") pattern, a sensing task, and a sensing RS mode based on the radio sensing capability report. In one embodiment, the first method includes executing, based on the configurations, one or more of the sensing task and interference management according to the sensing RS pattern and the sensing RS mode in response to the sensing task and the interference management being scheduled, respectively.

In one embodiment, a second apparatus includes a transceiver that receives a radio sensing capability report from a user equipment ("UE") device in response to a capability indication request configuration, transmits, to the UE device, configurations defining at least one sensing reference signal ("RS") pattern, a sensing task, and a sensing RS mode based on the radio sensing capability report, receives, from the UE device, a suitability message indicating a suitability of a configuration for at least one of the sensing RS pattern, the sensing task, and the sensing RS mode, and transmits, to the UE device, updated configurations defining at least one sensing reference signal ("RS") pattern, the sensing task, and the sensing RS mode based on the received suitability message.

In one embodiment, a second method includes receiving a radio sensing capability report from a user equipment ("UE") device in response to a capability indication request configuration, transmitting, to the UE device, configurations defining at least one sensing reference signal ("RS") pattern, a sensing task, and a sensing RS mode based on the radio sensing capability report, receiving, from the UE device, a suitability message indicating a suitability of a configuration for at least one of the sensing RS pattern, the sensing task, and the sensing RS mode, and transmitting, to the UE device, updated configurations defining at least one sensing reference signal ("RS") pattern, the sensing task, and the sensing RS mode based on the received suitability message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
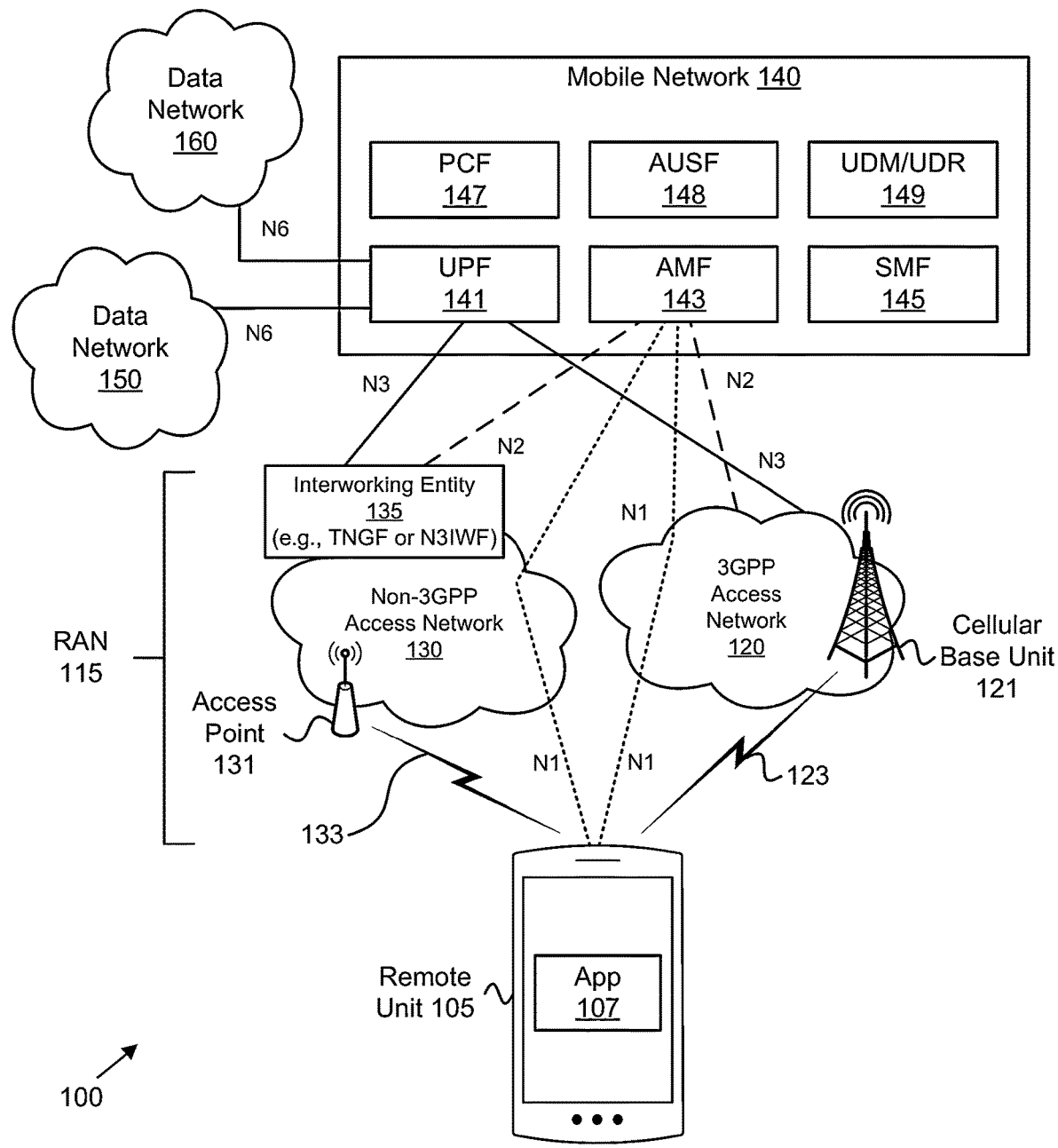
FIG. 1 is a schematic block diagram illustrating one embodiment of a wireless communication system for sensing reference signal adjustments for user equipment participation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-theshelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for sensing reference signal adjustments for user equipment participation. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Radio sensing is expected to appear in the future of the cellular wireless networks, both as a mechanism to improve the network performance, as well as an enabler to serve vertical use-cases. In particular, radio sensing obtains environment information by the means of:

transmission of a sensing excitation signal, hereafter termed as sensing RS, from a network entity, hereafter termed as sensing Tx node;
reception of the reflections/echoes of the transmitted sensing excitation signal from the environment by a network entity, hereafter termed as sensing Rx node; and
processing of the received reflections and inferring relevant information from the environment.

In order to enable radio sensing capability within the communication network, a sensing reference signal ("RS") needs to be defined and configured for sensing Tx and sensing Rx nodes in accordance with the requirements of a specific sensing task, the available network/UE capabilities for sensing measurement/processing and the available resources that can be used for sensing, while allowing for the communicating network function to continue without degradation. In order to achieve the abovementioned goal, in this disclosure, solutions are proposed for network and UE coordination in the context of radio sensing, with the goal of enabling:

UE capability definition for sensing participation;
dynamic UE-aided sensing RS pattern configuration; and
interference management between the sensing operation and the communication network.

As described in more detail below, in one embodiment, a method is disclosed for UE participation in definition of the sensing RS via signaling the sensing related UE capabilities, including the supported sensing RS types for transmission, for reception, and for joint transmission and reception, and a dynamic sensing RS pattern definition via a sensing RS suitability message.

In another embodiment, a resource muting method for controlling the interference is described from the sensing transmission to the communication network and from the communication network towards to the sensing operation.

FIG. 1 depicts a wireless communication system 100 for sensing reference signal adjustments for user equipment participation, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NS-SAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, regarding existing solutions within new radio ("NR"), available reference signals within NR, including demodulation RS ("DMRS"), phase tracking RS ("PTRS"), channel state information RS ("CSI-RS"), positioning RS ("PRS") and sounding RS ("SRS"), can be used as sensing excitation for some of the basic use-cases. As part of the current disclosure, solutions are discussed where some available RS are combined and/or augmented with additional parameters to define a satisfying sensing RS. Nevertheless, in one embodiment, since the available RS are not designed for the purpose of environment sensing but mainly to extract communication-needed channel parameters, the application of the reference signals for some of the use-cases either leads to a reduced signaling and/or resource efficiency (when an RS needs to be augmented with several other parameters/configurations to achieve a specific requirement, or when the spent resources are unnecessarily high due to the limited available patterns), or the infeasibility of the sensing task (e.g., when the sensing signal does not support the needed waveform parameters, e.g., cyclic prefix ("CP") overhead). The limitations of the use of the available reference signals may include:

Limited time/frequency domain pattern flexibility—the time/frequency pattern is a decisive factor to satisfy the fundamental radar requirements (e.g., in terms of supported distance dynamic range and resolution, speed dynamic range and resolution, radar processing gain, and/or the like), in an efficient manner. In most cases, the time-domain periodicity is usually fixed, or lacks the flexibility to define sensing RS efficiently, whereas the frequency domain patterns are usually limited. A relatively higher flexibility can be reached with CSI-RS (e.g., by enabling both time-periodicity as well as a proper frequency domain density over a large bandwidth). Nevertheless, this may support only single periodicity.

Limited flexibility on numerology/waveform parameter—symbol dedicated to sensing may follow a different CP duration and/or waveform parameters. This is particularly needed, e.g., when targeting a high-speed and/or high distance sensing scenario that requires especially large CP overhead and/or SCS, or, potentially another waveform.

Limited multiplexing flexibility—some of the proposed multiplexing methods for sensing RS are beneficial for facilitating large sensing excitations (e.g., when sensing continues over multiple milliseconds, it is beneficial to use superimposed sensing RS at least during part of the sensing RS transmission). The current reference signals currently do not support this or support limited multiplexing options (including SRS, CSI-RS).

Limited radar-specific sequence adjustment/separation— the possibility of the sequence adjustments is not supported in the current reference signals.

By defining a specific sensing RS, many of the other signalling requirements can be done implicitly, e.g., a specific sensing RS pattern also defines specific measurement criteria/requirements and/or the type of multiplexing.

In this disclosure, solutions are proposed for network and UE coordination in the context of radio sensing, addressing the following:

UE capability definition for sensing participation
  a. The UE sensing-related capabilities are defined as part of the capability message.

Dynamic UE-aided sensing RS pattern configuration
  a. UE sends 'suitability' feedback to the network upon reception of a sensing configuration or sensing RS or a combination thereof; and
  b. Network responds to the UE with an updated sensing configuration.

Interference management between the sensing operation and the communication network
  a. A resource muting method to restrict the coexistence of sensing RS resources with other sensing RS, other RS, or data/control channels via:
    i. Prioritization of the sensing RS transmission; and/or
    ii. Prioritization of a coexisting transmission with a sensing RS transmission.

In a first embodiment, the sensing configurations associated with a sensing task, including the sensing Tx nodes-defining parameters or sensing Rx nodes-defining parameters (e.g., defining which nodes to act as sensing Tx and which nodes to act as sensing Rx), the sensing RS-defining parameters, the sensing RS multiplexing type, the required sensing measurements and processing to be done by sensing Rx, sensing related reporting types, sensing related reporting resources, and/or the like, is communicated from the network to the UE nodes via some signalling method. The UE nodes, in one embodiment, include the UE nodes that are participating in the sensing operation as the sensing Tx or sensing Rx nodes, or a set of non-sensing UE nodes, e.g., when UE nodes are affected by the sensing operation, or a subset/combination thereof.

In some embodiments, the sensing-related UE capabilities defined within the elements of the current disclosure and the conducted sensing-related measurements are communicated from the UE to the network via physical UL data/control channels.

Figure 2:
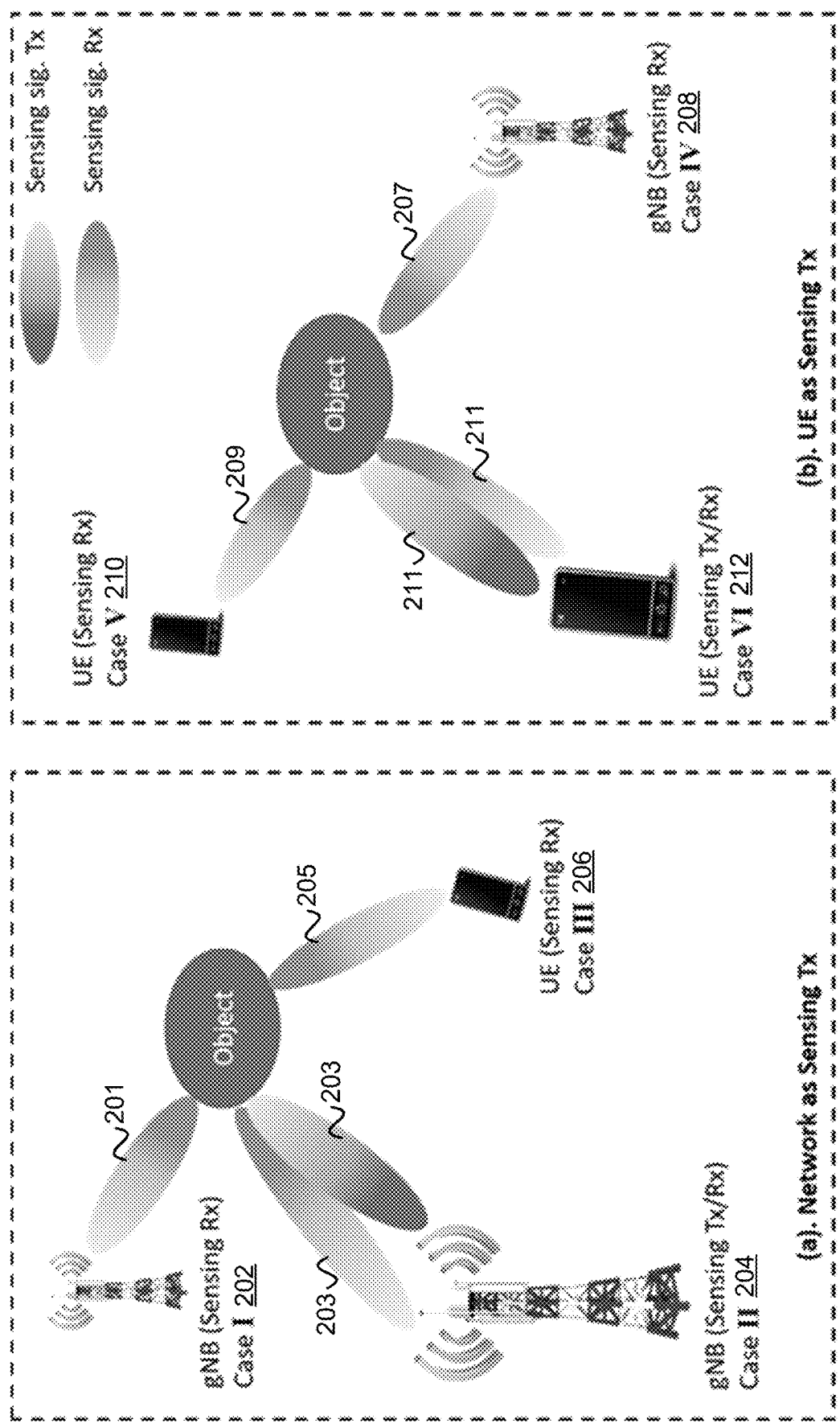
FIG. 2 depicts different possibilities for sensing scenarios with sensing RS transmission by the network, sensing RS reception by the network, sensing RS transmission by UEs, and/or sensing RS reception by the UEs for sensing reference signal adjustments for user equipment participation.

In this regard, the functional split between the network and the UE nodes for a specific sensing task may take various forms, depending on the availability of sensing-capable devices and the requirements of the specific sensing operation. The coordination of the network and UE nodes can take any or multiple of the following embodiments (at the same time), depending on the scenario, as shown in FIG. 2.

Case I (202). Sensing Tx as a network node and Sensing Rx as a separate network node: in this embodiment, the sensing RS 201 is transmitted and received by network entities. The network indicates the used sensing RS 201 to the other (non-network) nodes or a subset of the UE nodes via some signalling method, when, e.g., sensing RS 201 occupies same resources as other physical channels, and hence, the indication of the sensing RS 201 to a non-sensing node is used for the purpose of interference management, e.g., as an indication of sensing-dedicated resources where the overlapping transmission resources within the other non-sensing channels (e.g., physical uplink data/control channels) shall be muted to protect the sensing operation. In some embodiments, the indication of the sensing RS 201 to the non-sensing nodes is done where the sensing RS 201 is indicated to be re-used for other purposes (e.g., as an RS to track CSI information or synchronization) by the UE devices, or a combination thereof. In some cases, the indication of the sensing RS 201 includes implicit information on the used waveform parameters for the non-sensing nodes, e.g., CP/guard-band length for the UE nodes, the type of the required sensing processing and reporting procedure, and/or the like.

Case II (204). Sensing Tx as a network node and Sensing Rx as the same network node: in this embodiment, the sensing RS 203 is transmitted and received by the same network entity, utilizing proper duplexing capability (e.g., full duplex) to enable reception of the echoes transmitted by the same node. In some cases, the network indicates the used sensing RS 203 to the other (non-network) nodes or a subset of the UE nodes via some signalling method for the purposes similar to that of Case I, e.g., in order to perform interference management via muting of the interfering UL transmissions, as well as for the sensing RS 203 to be used, when applicable, by the UEs to use the sensing RS 203 transmission for other purposes.

Case III (206). Sensing Tx as network node and Sensing Rx as a UE node: in this embodiment, the sensing RS 205 is transmitted by a network entity and received by one (or multiple) UE nodes. The network indicates (implicitly or via direct assignment) the UE to operate as the sensing Rx, including (but not limited to) the definition of the sensing RS 205, the type of the sensing measurements, reporting criteria (a criteria upon which a reporting is sent by the UE), reporting message (message/information embedded in the report) and reporting resources (time/frequency/beam resources for reporting the sensing measurements). In some embodiments, the information regarding the sensing RS 205 shall be communicated to the other UE nodes which do not perform as a sensing Rx with a signalling method, for the similar purposes as defined in Case I. In some embodiments, the sensing RS 205 information is used by the non-sensing-Rx UEs to comply with an updated waveform parameter due to sensing, e.g., modification of CP/guard-bands during active sensing periods.

Case IV (208). Sensing Tx as a UE node and Sensing Rx as a network node: in this case, the sensing RS 207 is transmitted by a UE node and received by a network entity. The network indicates (implicitly or via direct assignment) the UE to operate as the sensing Tx, including the definition of the sensing RS 207. In some embodiments, the information regarding the sensing RS 207 shall be communicated to the other UE nodes which do not perform as a sensing Rx with a signalling method. In some embodiments, the sensing RS 207 information is used by the non-Sensing Rx UEs for interference management. In some embodiments, the interfering resource elements ("REs") (e.g., interference to the sensing operation associated with the indicated sensing RS 207 to the non-sensing nodes) within the transmission of DL data/control channels, UL data/control channels, and/or SL transmissions are muted to protect the performance of the sensing operation. In some embodiments, the sensing RS 207 information is used by the non-sensing-Rx UEs to comply with an updated waveform parameter due to sensing, e.g., modification of CP/guard-bands during active sensing periods.

Case V (210). Sensing Tx as a UE node and Sensing Rx as a separate UE node: in this embodiment, the sensing RS 209 is transmitted by a UE entity and received by another UE node. The network indicates (implicitly or via direct assignment) the UE to operate as the sensing Rx, the UE to operate as the sensing Tx, as well as the definition of the sensing RS 209, the type of the sensing measurements, and reporting strategy and reporting resources. In some embodiments, the information regarding the sensing RS 209 shall be communicated to the other UE nodes which do not perform as a sensing Rx with a signalling method, for the similar purposes as defined in Cases I, IV.

Case VI (212). Sensing Tx as a UE node and Sensing Rx as the same UE node: in this case, the sensing RS 211 is transmitted by a UE node and received by the same UE node. The network-UE communication is performed to configure the sensing UE with the sensing RS 211 where the UE jointly performing as sensing Tx and Rx with similar signalling possibilities as the previous cases. In some embodiments, the information regarding the sensing RS 211 shall be communicated to the other UE nodes which do not perform as a sensing Rx or a sensing Tx node, with a signalling method, for the similar purposes as defined in Cases I, IV.

In some embodiments, a sensing scenario consists of one or multiple of the above scenarios, e.g., when one or multiple network nodes together with one or multiple UE nodes or a combination thereof (jointly) act in sensing Tx mode and one or multiple UEs or one or multiple network nodes or a combination thereof operate with sensing Rx mode.

In some embodiments, when multiple of the above scenarios are defined, a shared sensing RS configuration can be done for different scenarios. In one embodiment, when multiple of the above scenarios are defined, separate sensing RS configuration can be done for different scenarios. In some embodiments, multiple of the above scenarios can be multiplexed in time, e.g., a first Sensing Tx/Sensing Rx node combination to operate at a first time-domain resource and a second sensing Tx/Sensing Rx node combination to operate at a second time-domain resource.

In some alternate embodiments, multiple of the above scenarios can be multiplexed in frequency, e.g., a first Sensing Tx/Sensing Rx node combination to operate at a first frequency-domain resource and a second sensing Tx/Sensing Rx node combination to operate at a second frequency-domain resource. In some embodiments, multiple of the above scenarios can be multiplexed jointly in time and frequency, e.g., a first Sensing Tx/Sensing Rx node combination to operate at a first time-frequency resource and a second sensing Tx/Sensing Rx node combination to operate at a second time-frequency resource. In some embodiments, the scenario multiplexing can be done in sequence/code domain, where a first sequence generation strategy is applied for the first scenario and a second sequence generation strategy is applied to the second scenario.

In one embodiment, a UE receives at least one configuration periodically, semi-persistently, or aperiodically (e.g., based on triggering) occurring time intervals (e.g., a slot, a set of slots, a subframe, and/or the like), where an extended cyclic prefix ("CP") is used in an orthogonal frequency-division multiplexing ("OFDM")/direct Fourier transform spread OFDM ("DFT-S-OFDM") symbol and one or more sensing RS resources are configured. In one embodiment, the one or more sensing RS resources configured in the time intervals comprises a first sensing RS to be transmitted by the UE, a second sensing RS to be received by the UE, and/or a zero-power sensing RS for which the UE performs rate-matching. In one example, each of the configured time intervals comprises a smaller number of OFDM/DFT-S-OFDM symbols per slot than other slots.

In one implementation, the at least one configuration of time intervals is a part of a sensing RS configuration. In another implementation, the at least one configuration of time intervals is included in a DL or UL bandwidth part ("BWP") configuration.

According to a second embodiment, the UE capability for participating in the sensing process is communicated to the network as part of the UE capability message.

In some embodiments, the capability of the UE for participating in the sensing process is defined specific to a mode of the sensing RS usage, e.g., sensing RS for transmission, sensing RS for reception, sensing RS for transmission and reception, the used frequency range for sensing (e.g., within a specific BWP or specific frequency range FR1/FR2), specific to a UE mode of operation (e.g., UE with time division duplex ("TDD"), frequency division duplex ("FDD"), full-duplex capability at a specific frequency band, and/or the like), and/or the like.

In some embodiments, the UE capability message includes capability indications for each of the modes or mode combinations. In some embodiments, a first UE capability is defined for one of the modes (or for a first combination of the modes) and a second UE capability is defined for a second mode (or for a second mode combination). In one embodiment, the UE can perform as a sensing Tx for FR1 frequency range, whereas the sensing Tx operation for FR2 or sensing Rx operation is not supported. In one embodiment, the UE supports sensing Tx, Rx, and/or joint sensing Tx and Rx operation modes at FR1 but may only support sensing Tx operation at FR2. In such an embodiment, a shared or different supported sensing RS configurations are defined for each of the supported mode combinations.

In some embodiments, the parameters defining the UE capability for sensing in a specific mode, or a combination of modes, include the supported sensing RS-defining parameters (or the supported parameter combinations defining the supported sensing RS), the supported multiplexing configurations for sensing RS multiplexing with other sensing RS and/or other data/control channels, the supported UE measurement types, or the supported UE reporting types, and/or a combination thereof.

The features defining the UE capabilities for sensing, where the UE acts as a sensing Tx for a sensing task associated with a sensing RS, is defined via the set of the supported sensing RS patterns, including (but not limited to):

the supported time-domain resource pattern for sensing RS, e.g., the maximum supported length of the sensing RS in time domain, maximum number of symbols or symbol density for sensing RS transmission, maximum supported power/energy for sensing RS transmission, and/or the like;

the supported frequency-domain resource pattern for sensing RS, e.g., the maximum supported bandwidth of the sensing RS in the frequency domain, maximum number of REs or RE density for sensing RS transmission, maximum supported power/energy for sensing RS transmission within a symbol or slot or a radio frame, and/or the like;

the supported joint time-frequency domain resource pattern for sensing RS, e.g., the maximum supported number of total REs per radio frame for sensing RS transmission, maximum supported power/energy for sensing RS transmission within a symbol or a slot or a radio frame, the supported frequency hopping patterns, and/or the like;

the supported spatial filters or beams or maximum supported number of simultaneously used spatial beams for sensing RS transmission;

the supported guard interval or CP overhead for sensing symbols within sensing RS transmission;

the supported computation/determination for choosing the sensing RS resource pattern among a set of possible patterns for sensing RS transmission;

the supported computation/determination methods for choosing the sensing RS sequence among a set of possible sequences for sensing RS transmission;

the supported sequence generation strategies or the supported sets of sequence-generation defining parameters for sensing RS transmission; and the supported sequence-to-resources mapping-defining parameter set for sensing RS pattern generation for transmission.

The features defining UE capabilities for sensing, where the UE acts as a sensing Rx for a sensing task associated with a sensing RS, is defined via the set of the supported sensing RS patterns, including (but not limited to):

the supported time-domain resource pattern for sensing RS reception, e.g., the maximum supported length of the sensing RS in time domain, maximum number of symbols or symbol density for sensing RS reception, and/or the like;

the supported frequency-domain resource pattern for sensing RS reception, e.g., the maximum supported bandwidth of the sensing RS in the frequency domain, maximum number of REs or RE density for sensing RS reception, and/or the like;

the supported joint time-frequency domain resource pattern for sensing RS reception, e.g., the maximum number of total REs per radio frame for sensing RS reception, the supported frequency hopping patterns for sensing RS reception, and/or the like;

the supported spatial filters or beams or maximum number of simultaneously used spatial beams for sensing RS reception;

the supported guard interval or CP overhead for sensing symbols within sensing RS reception;

the supported detection/determination for a (partially) unknown received sensing RS resource pattern among a set of possible patterns for sensing RS reception;

the supported detection/determination for a (partially) unknown received sensing RS sequence among a set of possible sequences;

the supported sequence generation strategies for sensing RS transmission;

the supported sequence-to-resources mapping-defining parameter set for sensing RS reception.

The features defining UE capabilities for sensing, where the UE acts jointly as a sensing Rx and sensing Tx (e.g., in a full-duplex fashion with simultaneous transmission and reception) for a sensing task associated with a sensing RS is defined via the set of the supported sensing RS patterns, including (but not limited to):

the supported time-domain resource pattern for sensing RS joint transmission and reception;

the supported frequency-domain resource pattern for sensing RS joint transmission and reception;

the supported joint time-domain and/or frequency-domain resource pattern including the supported frequency hopping patterns for sensing RS joint transmission and reception;

the supported transmit and receive beam combinations for sensing RS joint transmission and reception;

the supported transmit power, e.g., average transmit power during sensing, maximum average transmit power during sensing in any of the slots, maximum transmit power during any transmit symbol, total sensing RS energy, and/or the like, for sensing RS joint transmission and reception;

the features for the supported transmit power for sensing which are defined specific to a transmit beam or Tx/Rx beam combination supported for joint sensing RS transmission and reception; and features that define any allowed combination of the supported set of sensing RS for transmission and the supported set of sensing RS for reception.

The features defining UE capabilities for sensing RS multiplexing are including (but not limited to):

the number of sensing RS that can be multiplexed within the same radio frame, or exist at the same time (e.g., exist when other ones are started and before the other ones are ended);

the type of data channels and/or control channels or other RSs that can coexist with a sensing RS (e.g., exist after the said channel and/or RS starts and before the said channel and/or RS ends);

the support of DFT spreading on the sensing RS, or the multiplexed sensing RS; and for all the above, the supported type of multiplexing.

The features defining UE capabilities for sensing measurements, where the UE operates as sensing Rx, is defined via the set of supported measurement types, including (but not limited to):

the supported methods or computational models for sensing measurement (e.g., time-domain processing for time-of-flight estimation, CP-OFDM based doppler and/or range estimation, available computational and/or AI models for sensing measurements, and/or the like);

the support of distance and/or range estimation, supported dynamic range of the object distance for estimation, supported distance estimation resolution, and/or the like;

the support of object speed estimation, supported dynamic range of the object speed for estimation, supported speed estimation resolution, and/or the like;

the support of the angular estimation (e.g., direction of arrival ("DoA") estimation), supported dynamic range of the DoA for estimation, supported DoA estimation resolution, and/or the like;

the maximum number of simultaneously supported objects for sensing measurements; and support of measurement features defined as the combination of any of the above features, e.g., support of DoA estimation for the objects with a specific distance dynamic range and a specific distance resolution.

The features defining UE capabilities for sensing measurements reporting, where the UE operates as sensing Rx, is defined via the set of supported measurement reporting types, including (but not limited to):

type of the supported message and/or reporting (e.g., compression of the measurements, the estimated parameters, event-based reporting with a defined criterion, and/or the like);

duration that a measurement message can be stored by the UE before transmission and/or reporting;

the supported reporting criterion (e.g., comparing an estimated distance with a threshold, computational models for checking a reporting criteria, and/or the like); and supported compression types for the reporting message.

In some embodiments, for each of the above capability information elements, or a combination thereof, a category for UE capability for sensing is defined, which defines the supported combinations of the said UE capabilities for sensing. In some embodiments, the UE capability information, including (but not limited to) any combination of the above elements, are defined within the radio resource control ("RRC") message dedicated to UE capability information.

In some embodiments, some of the capability indications for sensing are defined on a per-UE basis, on a per-band basis, on a per-cell basis, and/or a combination thereof. In some embodiments, the UE capability information for sensing is defined as part of the physical layer parameters within the RRC UECapabilityInformation message. In some embodiments, some of the UE capability information for sensing is defined as part of the physical layer parameters, as a UE feature set or feature group defined for sensing related capability information, as part of the measurement parameters, and/or the like. In some embodiments, the message containing UE capability is transmitted periodically, semi-persistently, or aperiodically. In some embodiments, a first set of the UE capability information is transmitted via one type of scheduling (e.g., dynamically), whereas a second part of the UE capability information is transmitted via a second type of scheduling (e.g., semi-persistently).

Figure 3:
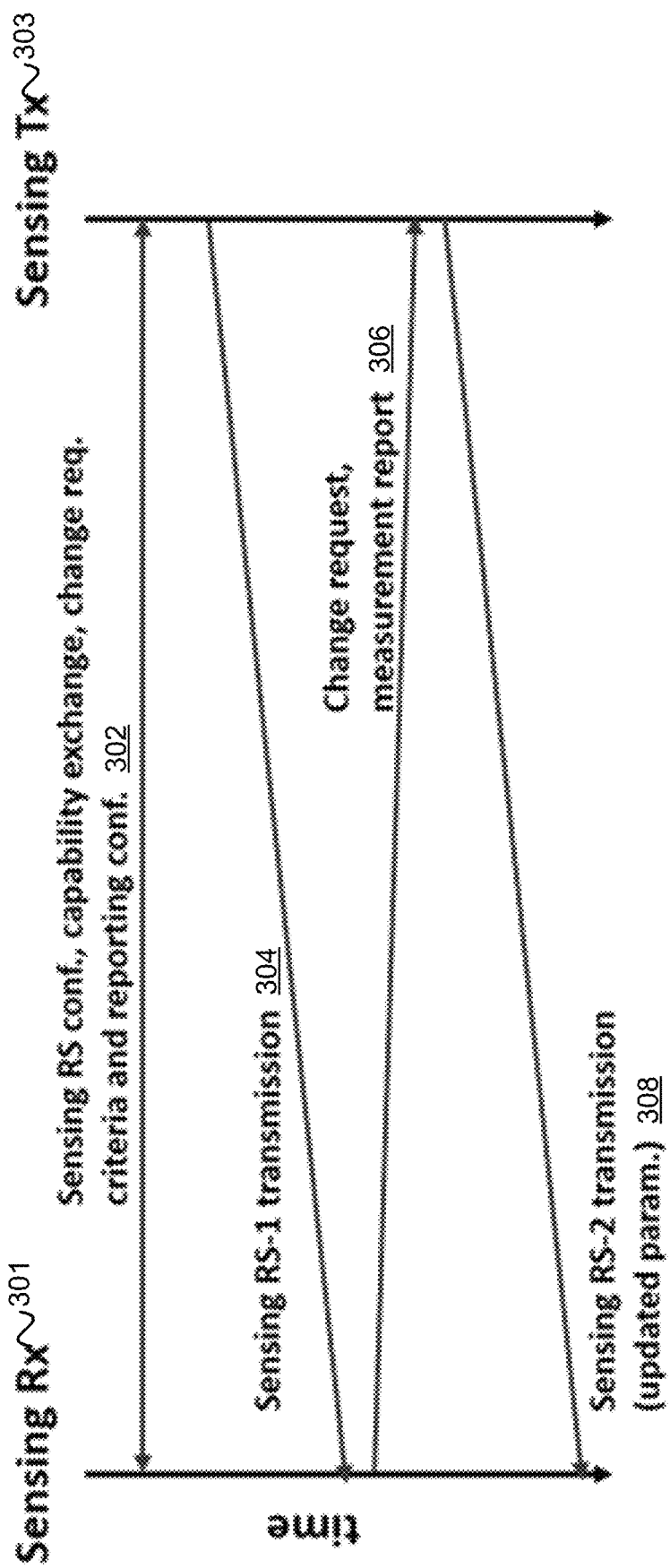
FIG. 3 depicts an example message exchange for dynamic sensing RS adjustment between sensing Tx and sensing Rx nodes for sensing reference signal adjustments for user equipment participation.

FIG. 3 depicts an example message exchange for dynamic sensing RS adjustment between sensing Tx 303 and sensing Rx 301 nodes. In some embodiments a UE entity, as a sensing Rx node 301, sends a request (see messaging 306) or suggestion for a modification or determination of the sensing RS parameters or a subset thereof, hereafter known as a change request or a sensing RS suitability message as a feedback from the sensing Rx 301 node, after first exchanging capability information (see messaging 302) and receiving a sensing RS transmission (see messaging 304). In some embodiments, the sensing RS suitability message includes a definition or indication of the new sensing RS (or a previously defined sensing RS), a subset of the sensing RS properties, e.g., increased time-domain duration or spacing, and/or the like In some embodiments, the feedback from the sensing Rx 301 includes a suggestion for a relative change in some of the parameters, e.g., an increase or a decrease with value X within the parameter Y, where Y belongs to the sensing RS-defining parameter set. In some embodiments, the requested change is indicated via an index from a codebook, where the codebook includes possible configurations for (a subset of) sensing RS parameters or includes possible change configurations (e.g., doubling the inter-symbol spacing in time domain).

In some embodiments, the feedback from the sensing Rx 301 is transmitted at the end of the sensing RS transmission, or at a known distance or occasion once the sensing RS transmission is concluded. In this case, the modification of the sensing RS is applicable for the next sensing RS occasion, if configured. In some embodiments, the feedback from the sensing Rx 301 is transmitted prior to the end of the sensing RS transmission. In some embodiments, the expected occasions for the transmission of a sensing RS suitability message are configured by RRC, dynamically via downlink control information ("DCI"), and/or via a group common DCI message when the sensing Tx is received by multiple sensing Rx nodes.

In some embodiments, the feedback from the sensing Rx 301 does not include any sensing measurements. In some embodiments, the sensing RS suitability message is accompanied with sensing measurements collected from the (portion of) the received sensing RS prior to the preparation or transmission of the sensing RS suitability message. In some embodiments, the change request is accompanied with sensing measurements only when some conditions are met, e.g., the achieved radar processing gain via the already received sensing RS is above a threshold.

In some embodiments, criteria for the transmission of such a sensing RS suitability message (e.g., when the ratio of the average collected energy from the sensing RS to noise falls below a threshold, or when the sensing RS, together with the type of the sensing measurement, leads to an overflow of the UE buffer and/or processing capability), a computational model or strategy for the determination of such feedback is transferred or indicated to the sensing Rx nodes 301.

In some embodiments, the change request is accompanied with a report related to the request criteria, where the reporting criteria, reporting information, and/or reporting resources are indicated to the sensing Rx 301 by the network via a semi-static or dynamic signaling. In some embodiments, the determination by sensing Tx 303 of a modification of a set of sensing RS parameters is indicated to the sensing Rx 301 before the implementation of the modified parameters.

In some embodiments, the transmission or reception of the sensing RS suitability message, type of the supported measurements, request criteria, the supported change types, the supported time-window for the change enforcement (e.g., reception of the new sensing RS configuration with updated parameters), change request transmission (e.g., required time from the beginning of the sensing RS reception to the transmission of the suitability message), the type or frequency of the reporting, and/or a combination thereof is indicated as a capability of the sensing Rx device. Furthermore, from the sensing Tx 303 side, in one embodiment, when sensing Tx 303 is also a UE device, the supported time-window for the change enforcement (e.g., transmission (see messaging 308) of the new sensing RS configuration with updated parameters) and the supported sensing RS modifications are indicated as a capability of the sensing Tx 303 device.

According to a third embodiment, the resources for the transmission of sensing RS, or resources for the transmission of a data channel and/or control channel or other RSs are muted in order to control the interference among the sensing and the communication network.

In some embodiments, upon the definition or indication of the sensing RS resources for a node, where the node is a sensing Tx node associated with the defined sensing RS, a node that is a sensing Rx node associated with the defined sensing RS, a node that is jointly the sensing Rx and sensing Tx node associated with the defined sensing RS for the defined sensing RS, a node that is not a sensing Rx and not a sensing Tx node associated to the defined sensing RS, and/or the like, the resources from other transmission or reception at the said node which are coinciding with the indicated sensing RS resources are muted to prevent interference from the a priori or previously configured transmissions or receptions (e.g., belonging to a physical DL or UL data channel or control channel or another RS transmission or reception, or other previously configured sensing RS).

In such embodiments, when the muting of the resources is done on a previously configured physical DL or UL data channel or control channel, the said data channel or control channel is rate-matched around the muted resource, and when the muted resources belong to another RS transmission or reception or another sensing RS transmission or reception at the node, the transmission, reception, or processing will be done by eliminating or neglecting the transmission and/or reception from the muted resource. In some embodiments, the used RS sequence element within the muted resources is also eliminated or shifted to a next non-muted RE via a defined sequence-to-physical resource mapping procedure.

In some embodiments, the indication or definition of sensing RS resources to a node with a priori or previously configured resources for transmission or reception of other channels or other RSs, also includes an indication for the type or resource muting. In some embodiments, the type of muting includes an indication of a priority or significance of the associated sensing task. In some embodiments, when the muting is done according to a defined priority, a value indicating the priority of the a priori configured resources are also communicated to the associated nodes. In some embodiments, the type of muting includes a muting pattern, where the said interfering resources are muted according to a specific pattern (e.g., muting of one every two, or n every m interfering REs with a specific pattern or time or frequency domain spacing). In some embodiments, the muting configuration is done via the modification of an a priori configured resource pattern via an indicated new pattern, where the new pattern is a combination of the a priori configured resource pattern and the newly indicated pattern. In some embodiments, the combination type is a pattern subtraction, where the indicated REs within the second pattern are muted.

In some embodiments, upon the definition or indication of the UL or DL data channel or control channel resources for a node, where the node is a sensing Tx node associated with an a priori defined sensing RS, a node that is a sensing Rx node associated with an a priori defined sensing RS, or a node that is jointly the sensing Rx and sensing Tx node associated with an a priori defined sensing RS, the resources from the sensing RS transmission or reception at the node that coincide with the indicated resources are muted to prevent interference from the a priori configured sensing transmissions.

In such an embodiment, the transmission, reception, processing, and/or measurements will be done by eliminating or neglecting the transmission and/or reception from the muted resource. In some embodiments, the used RS sequence element within the muted resources is also eliminated. In some alternate embodiments, the used RS sequence element within the muted resources is shifted to a next non-muted RE via a defined sequence-to-physical resource mapping procedure.

In some embodiments, the indication or definition of resources to a node with a priori configured sensing resources, also includes an indication for the type of resource muting. In some embodiments, the type of muting includes an indication of a priority or significance of the associated task to the configured resources. In some embodiments, when the muting is done according to a defined priority, a value indicating the priority of the a priori configured resources are also communicated to the associated nodes. In some embodiments, the type of muting includes a muting pattern, where the said interfering resources are muted according to a specific pattern. In some embodiments, the muting configuration is done via the modification of an a priori configured resource pattern via an indicated new pattern, where the new pattern is a combination of the a priori configured resource pattern and the newly indicated pattern. In some embodiments, the said combination type is a pattern subtraction, where the indicated REs within the second pattern coexisting with the first pattern are muted.

Figure 4:
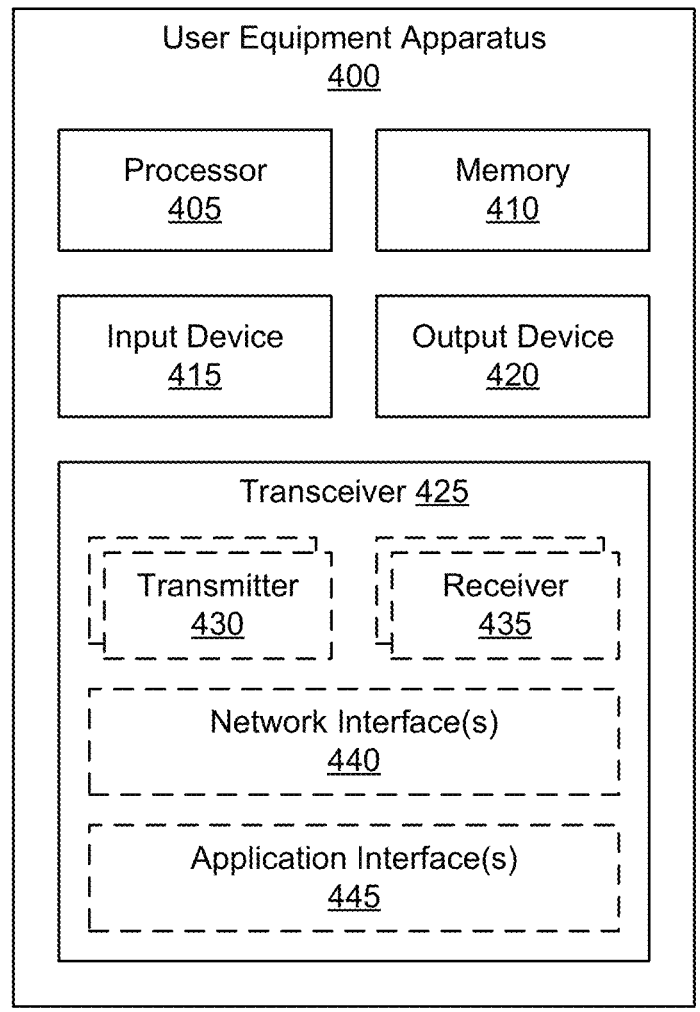
FIG. 4 is a block diagram illustrating one embodiment of a user equipment apparatus that may be used for sensing reference signal adjustments for user equipment participation.

FIG. 4 depicts a user equipment apparatus 400 that may be used for sensing reference signal adjustments for user equipment participation, according to embodiments of the disclosure. In various embodiments, the user equipment apparatus 400 is used to implement one or more of the solutions described above. The user equipment apparatus 400 may be one embodiment of the remote unit 105 and/or the UE, described above. Furthermore, the user equipment apparatus 400 may include a processor 405, a memory 410, an input device 415, an output device 420, and a transceiver 425.

In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. In some embodiments, the transceiver 425 communicates with one or more cells (or wireless coverage areas) supported by one or more base units 121. In various embodiments, the transceiver 425 is operable on unlicensed spectrum. Moreover, the transceiver 425 may include multiple UE panel supporting one or more beams. Additionally, the transceiver 425 may support at least one network interface 440 and/or application interface 445. The application interface(s) 445 may support one or more APIs. The network interface(s) 440 may support 3GPP reference points, such as Uu, N1, PC5, etc. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and operating system ("OS") functions and a baseband processor (also known as "baseband radio processor") which manages radio functions.

In various embodiments, the processor 405 and transceiver 425 control the user equipment apparatus 400 to implement the above described UE behaviors. In one embodiment, the transceiver 425 transmits a radio sensing capability report to a network node of a mobile wireless communication network in response to a capability indication request configuration received from the network node. In one embodiment, the transceiver 425 receives, from the network node, configurations defining at least one sensing reference signal ("RS") pattern, a sensing task, and a sensing RS mode based on the radio sensing capability report.

In one embodiment, the first apparatus includes a processor 405 that executes, based on the configurations, one or more of the sensing task and interference management according to the sensing RS pattern and the sensing RS mode in response to the sensing task and the interference management being scheduled, respectively.

In one embodiment, the sensing task comprises usage of the sensing RS pattern configuration by one of the configurations. In one embodiment, the mode for the sensing RS utilization comprises at least one of transmission of the defined sensing RS patterns, reception of the defined sensing RS patterns, sensing-to-communication interference control, and communication-to-sensing interference control.

In one embodiment, the sensing RS mode comprises at least one of transmission of the defined sensing RS patterns, reception of the defined sensing RS patterns, sensing-to-sensing interference control, sensing-to-communication interference control, and communication-to-sensing interference control.

In one embodiment, the radio sensing capability report comprises at least one of a set of supported sensing RS configurations for one or more of sensing RS transmissions and sensing RS receptions, a set of frequency bands that the UE supports for a sensing operation, a set of supported multiplexing types for sensing RS, a set of supported measurement types for sensing RS reception, a set of supported reporting types according to sensing measurements, and a set of capability features based on one or more of the foregoing.

In one embodiment, the radio sensing capability report further comprises at least one of the supported beams or beam configurations for sensing RS reception or for transmission or for joint transmission and reception (e.g., the information of beams (e.g., beam directions, Tx filter indices from the codebook, beam direction, and/or the like) that can be used for sensing RS transmissions, maximum number of simultaneous beams for sensing RS transmissions, and/or the like), supported Tx power for each supported beam where simultaneous transmission and reception is not taking place at the UE, supported Tx power for each supported beam where simultaneous transmission and reception is taking place at the UE, the type of the supported sensing RS measurements (e.g., the types of measurement objectives, e.g., distance or speed, in the range r1 to r2, the supported estimation methods, the maximum memory buffer, maximum computational resource, and/or the like), a set of sensing RS-defining parameters for the supported sensing RS configurations for sensing RS reception, for transmission and/or for joint transmission and reception, the maximum supported time-duration of the sensing RS for reception, for transmission, and/or for joint transmission and reception of sensing RS, the maximum supported number of REs within the sensing RS for reception, for transmission, and/or for joint transmission and reception of sensing RS, the supported sensing RS patterns along the time-domain or frequency domain or jointly via the time and frequency domain for reception, for transmission, and/or for joint transmission and reception of sensing RS, the supported mapping types for sensing RS reception, for transmission, and/or for joint transmission and reception, a maximum number of sensing RS patterns included within a time or frequency unit for transmission, for reception, and/or for joint transmission and reception or a combination thereof (e.g., co-existing within a slot or subframe or frame or within an RB or a combination thereof, this can be a different or a joint number for transmissions, receptions, joint transmission and receptions), the supported multiplexing types (e.g., maximum number of supported orthogonalization via CBG, or via harmonic phase rotations for sensing RS transmission or reception), the supported incomplete sensing RS resource pattern recovery configurations (e.g., maximum number/portion of the REs with unknown locations and/or the maximum size of the unknown search space, e.g., the number of potential pattern combinations that has to be examined), the supported incomplete sensing RS sequence recovery configurations (e.g., maximum number/portion of the REs with unknown sequence value and/or the maximum size of the unknown search space, e.g., the number of potential sequence combinations that has to be examined), the supported DFT spreading configurations (including, e.g., available DFT block sizes, the speed that they can be updated/replaced, and/or the like), the supported types of the pre-DFT filtering for multiplexing (e.g., the supported sizes and mapping types, codebook ID of supported matrices/matrix types, and/or the like), the supported types of the pre-IFFT filtering (matrices for the supported pre-IFFT filers and the supported dimension), and a set of the supported multiplexing configurations for sensing RS.

In one embodiment, the processor 405 schedules the capability report for sensing with at least one of one or more aperiodic resources, one or more periodic resources and one or more semi-persistent resources. In one embodiment, the capability report for sensing comprises an indication of one or more capability-defining indices from a codebook, the codebook comprising possible capability information combination and features.

In one embodiment, at least one of parameters for the sensing RS pattern are defined based on at least one of parameters for the sensing RS pattern and parameters associated with the capability information of the UE (e.g., a specific sensing RS resource pattern in time domain and the capability information also indicate a specific frequency pattern, doppler, and/or range measurements requirement with a specific resolution).

In one embodiment, transceiver 425 transmits a message to the network node indicating a suitability of a configuration for at least one of the sensing RS pattern, the sensing task, and the sensing RS mode based on a configuration for generating the suitability message and a configuration defining a set of resources for transmission of the suitability message.

In one embodiment, the processor 405 generates the suitability message in response to one or more of reception of a sensing RS configuration, reception of a sensing RS mode, reception of a sensing task configuration, reception of at least a portion of a sensing RS, and transmission and reception of at least a portion of the sensing RS. In one embodiment, the configuration for defining the set of resources comprises definitions defining at least one of a set of time resources, a set of frequency resources, and a set of beam resources for transmission of the suitability message.

In one embodiment, the transceiver 425 receives a new configuration for at least one of the sensing RS pattern, the sensing task, and the sensing RS mode based on the suitability indicated in the message. In one embodiment, the suitability message comprises at least one of a sensing measurement result from a portion of a received sensing RS, an indication of a portion of the sensing RS over which the suitability message is generated from, an indication that at least one of available memory, available energy, and available computational buffer violates a predefined threshold, an indication that at least a portion of a received sensing RS is below a power threshold, an indication that the received sensing RS for joint transmission and reception configuration leads to a self-interference above a predefined threshold at at least one of configured beam pairs and configured transmit power (e.g., when the joint FD transmission and reception scheme is configured for the first device), an indication that a required measurement accuracy may not be achieved, an indication of a type of the targeted measurement accuracy that may not be achieved, an indication that available cyclic prefix ("CP") overhead for at least some sensing symbols is one of above a threshold and below a threshold, a subset of a sensing RS configuration that may not be supported by the UE at time of configuration, and a recommendation of at least one of repetition and change for a subset of sensing RS configuration-defining parameters.

In one embodiment, the processor 405 performs sensing measurements using a combination of at least a portion of a first sensing RS and a second sensing RS based on a configuration defining a joint measurement type, the first sensing RS based on a previous sensing RS configuration and the second sensing RS based on an updated sensing RS configuration (e.g., the first and second received sensing RS are jointly used to perform the measurement).

In one embodiment, the apparatus further includes, as part of a configuration for the sensing task, one or more of means for controlling interference from sensing RS pattern transmission to a communication channel and means controlling interference from the communication channel to sensing RS reception, and means controlling interference from the sensing RS transmission to sensing RS reception.

In one embodiment, the means for controlling interference from sensing RS pattern transmission to a communication channel comprises one or more of muting and power backoff for the sensing RS transmission and wherein the means controlling interference from the communication channel to sensing RS reception comprises one or more of muting and power backoff for the communication channel.

In one embodiment, the processor 405 one or more of mutes transmission of a previously configured sensing RS within resources coinciding with an indicated sensing RS, neglects reception of a previously configured sensing RS within the resources coinciding with the indicated sensing RS, and adjusts a sequence length and mapping of the previously configured sensing RS around muted resource elements.

In one embodiment, the processor 405 one or more of mutes transmission of at least one of a UL data channel and a UL control channel within resources coinciding with an indicated sensing RS, neglects reception of at least one of a DL data channel and a DL control channel within the resources coinciding with the indicated sensing RS, and rate matches around at least one of muted resource elements and neglected resource elements for at least one of transmission and reception of at least one of a data channel and a control channel.

In one embodiment, the transceiver 425 receives one of a configuration and a criterion associated with the muting (e.g., if the associated data/control channel is associated with a high importance, or the sensing RS is associated with a high importance, based on some indicated parameters, or prone to an interference) and the processor 405 one or more of mutes transmission, according to at least one of the received muting configuration and the criterion, of a previously configured sensing RS within a subset of resources coinciding with indicated sensing RS resources following a configured resource selection (e.g., only half of the resources in time domain and a quarter of the resources in the frequency domain to be muted), neglects reception of a previously configured sensing RS within muted resources, and adjusts a sequence length and mapping of the previously configured sensing RS around muted resource elements.

In one embodiment, the transceiver 425 receives one of a configuration and a criterion associated with the muting (e.g., if the associated data/control channel is associated with a high importance, or the sensing RS is associated with a high importance, based on some indicated parameters, or prone to an interference) and the processor 405 one or more of mutes transmission, according to at least one of the received muting configuration and the criterion, of at least one of a UL data channel and a UL control channel within a subset of resources coinciding with indicated sensing RS resources following a configured resource selection (e.g., only half of the resources in time domain and a quarter of the resources in the frequency domain to be muted), neglects reception of at least one of a DL data channel and a DL control channel within the resources coinciding with the indicated sensing RS resources, and rate matches around at least one of muted resource elements and neglected resource elements for at least one of transmission and reception of at least one of a data channel and a control channel.

In one embodiment, the sensing task comprises at least one of transmission of the sensing RS pattern, reception of the sensing RS pattern, the sensing RS transmitted by the UE, reception of the sensing RS pattern, the sensing RS transmitted by a second device, interference management according to the received sensing RS pattern, taking sensing measurements on the received sensing RS, and transmitting a sensing measurement report to a network device.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to sensing reference signal adjustments for user equipment participation. For example, the memory 410 may store various parameters, panel/beam configurations, resource assignments, policies, and the like as described above. In certain embodiments, the memory 410 also stores program code and related data, such as an operating system or other controller algorithms operating on the user equipment apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all, or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 includes at least transmitter 430 and at least one receiver 435. One or more transmitters 430 may be used to provide UL communication signals to a base unit 121, such as the UL transmissions described herein. Similarly, one or more receivers 435 may be used to receive DL communication signals from the base unit 121, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
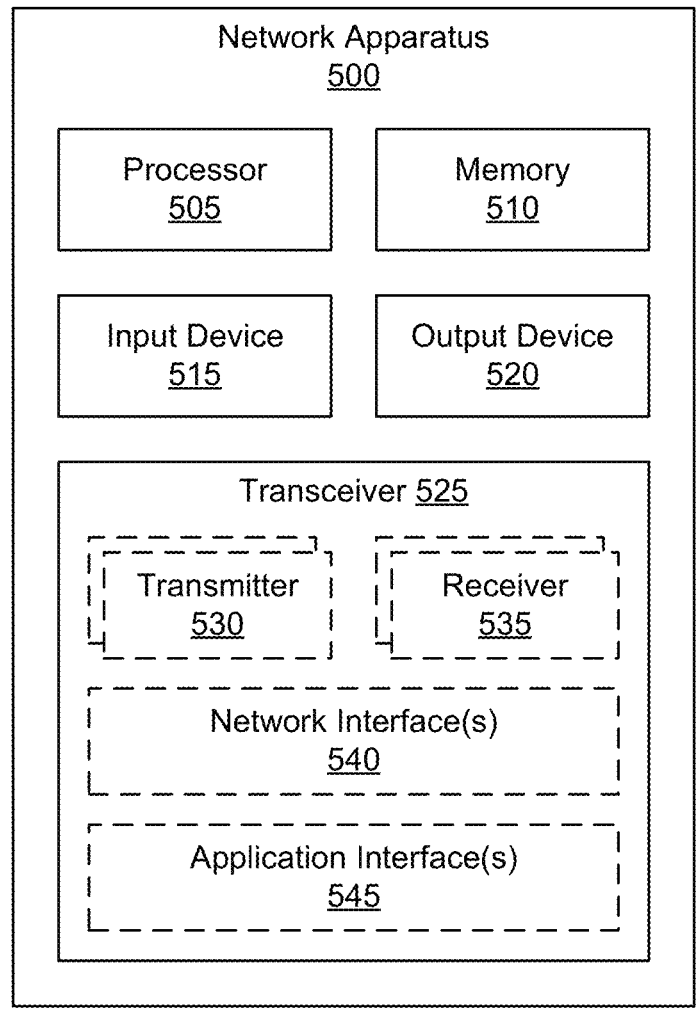
FIG. 5 is a block diagram illustrating one embodiment of a network apparatus that may be used for sensing reference signal adjustments for user equipment participation.

FIG. 5 depicts a network apparatus 500 that may be used for sensing reference signal adjustments for user equipment participation, according to embodiments of the disclosure. In one embodiment, network apparatus 500 may be one implementation of a RAN node, such as the base unit 121, the RAN node 210, or gNB, described above. Furthermore, the base network apparatus 500 may include a processor 505, a memory 510, an input device 515, an output device 520, and a transceiver 525.

In some embodiments, the input device 515 and the output device 520 are combined into a single device, such as a touchscreen. In certain embodiments, the network apparatus 500 may not include any input device 515 and/or output device 520. In various embodiments, the network apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more remote units 105. Additionally, the transceiver 525 may support at least one network interface 540 and/or application interface 545. The application interface(s) 545 may support one or more APIs. The network interface(s) 540 may support 3GPP reference points, such as Uu, N1, N2 and N3. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio function.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to sensing reference signal adjustments for user equipment participation. For example, the memory 510 may store parameters, configurations, resource assignments, policies, and the like, as described above. In certain embodiments, the memory 510 also stores program code and related data, such as an operating system or other controller algorithms operating on the network apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the network apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all, or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with the UE, as described herein. Similarly, one or more receivers 535 may be used to communicate with network functions in the non-public network ("NPN"), PLMN and/or RAN, as described herein. Although only one transmitter 530 and one receiver 535 are illustrated, the network apparatus 500 may have any suitable number of transmitters 530 and receivers 535. Further, the transmitter(s) 530 and the receiver(s) 535 may be any suitable type of transmitters and receivers.

In one embodiment, the transceiver 525 receives a radio sensing capability report from a user equipment ("UE") device in response to a capability indication request configuration, transmits, to the UE device, configurations defining at least one sensing reference signal ("RS") pattern, a sensing task, and a sensing RS mode based on the radio sensing capability report, receives, from the UE device, a suitability message indicating a suitability of a configuration for at least one of the sensing RS pattern, the sensing task, and the sensing RS mode, and transmits, to the UE device, updated configurations defining at least one sensing reference signal ("RS") pattern, the sensing task, and the sensing RS mode based on the received suitability message.

Figure 6:
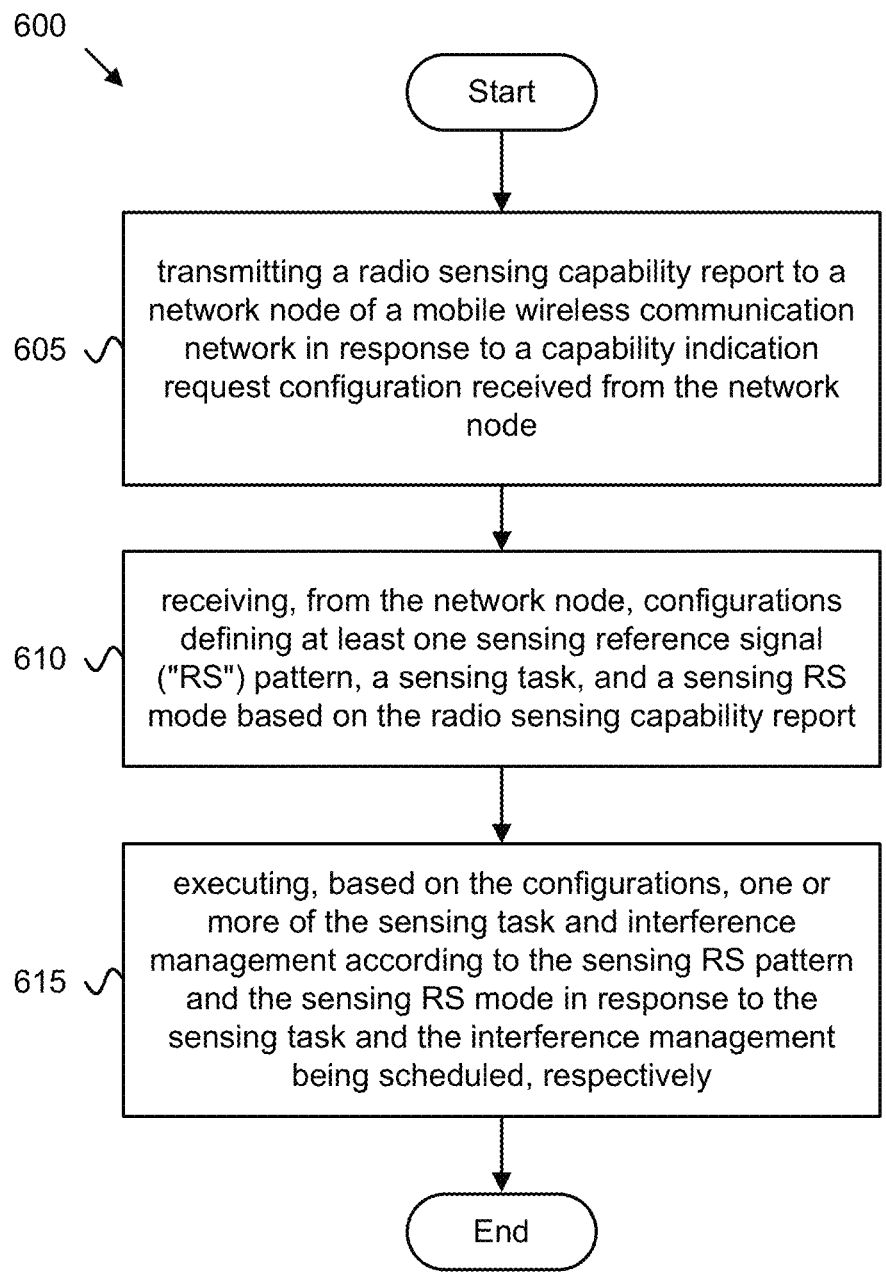
FIG. 6 is a flowchart diagram illustrating one embodiment of a method for sensing reference signal adjustments for user equipment participation.

FIG. 6 is a flowchart diagram of a method 600 for sensing reference signal adjustments for user equipment participation. The method 600 may be performed by a remote unit 105 such as a UE or a user equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 includes transmitting 605 a radio sensing capability report to a network node of a mobile wireless communication network in response to a capability indication request configuration received from the network node. In one embodiment, the method 600 includes receiving 610, from the network node, configurations defining at least one sensing reference signal ("RS") pattern, a sensing task, and a sensing RS mode based on the radio sensing capability report. In one embodiment, the method 600 includes executing 615, based on the configurations, one or more of the sensing task and interference management according to the sensing RS pattern and the sensing RS mode in response to the sensing task and the interference management being scheduled, respectively, and the method 600 ends.

Figure 7:
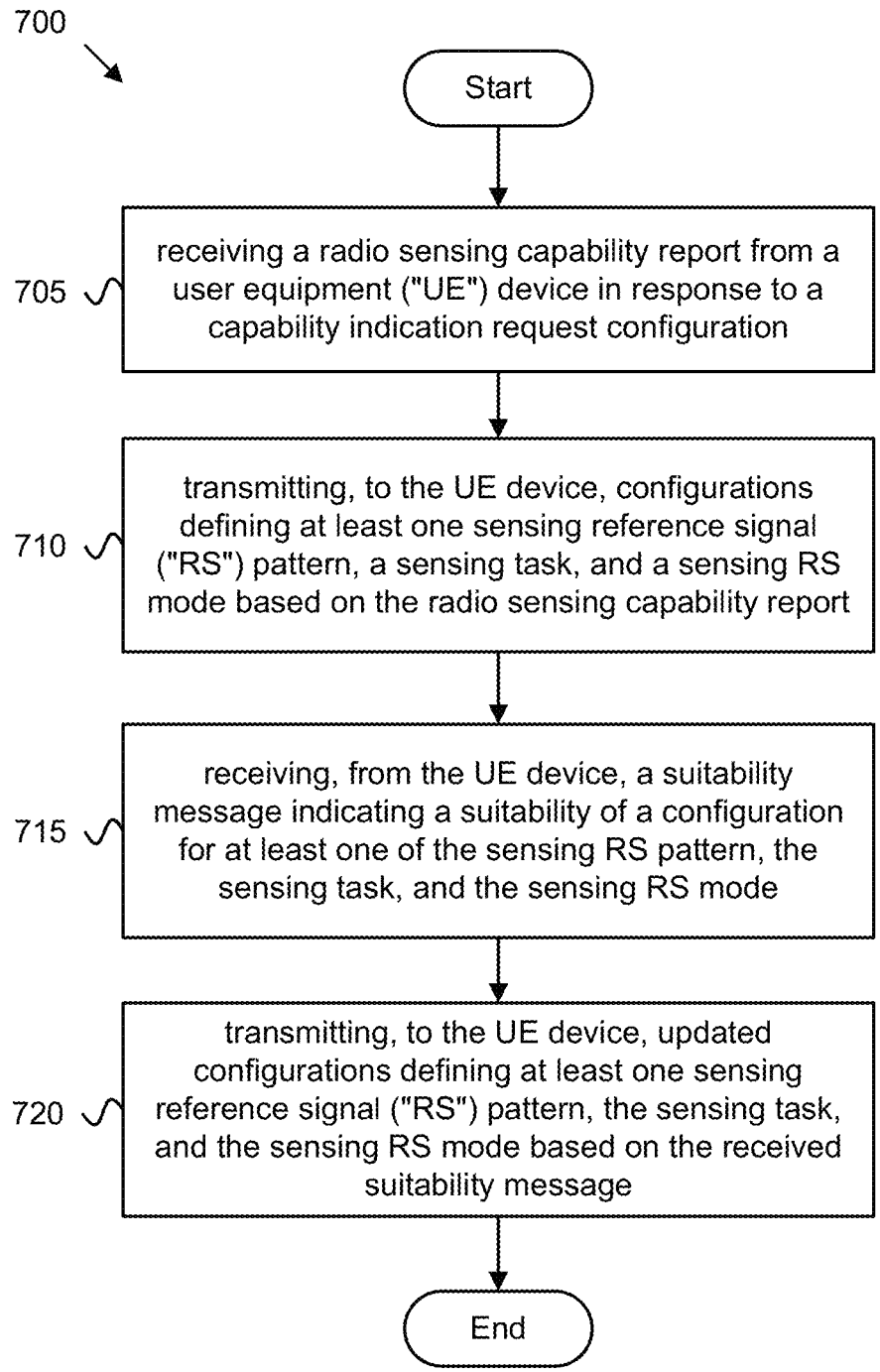
FIG. 7 is a flowchart diagram illustrating one embodiment of another method for sensing reference signal adjustments for user equipment participation.

FIG. 7 is a flowchart diagram of a method 700 for sensing reference signal adjustments for user equipment participation. The method 700 may be performed by a network entity such as a base node, a gNB, and/or the network equipment apparatus 500. In some embodiments, the method 700 may be performed by a processor executing program code, for example, a microcontroller, a microprocessor, a CPU, a GPU, an auxiliary processing unit, a FPGA, or the like.

In one embodiment, the method 700 includes receiving 705 a radio sensing capability report from a user equipment ("UE") device in response to a capability indication request configuration. In one embodiment, the method 700 includes transmitting 710, to the UE device, configurations defining at least one sensing reference signal ("RS") pattern, a sensing task, and a sensing RS mode based on the radio sensing capability report.

In one embodiment, the method 700 includes receiving 715, from the UE device, a suitability message indicating a suitability of a configuration for at least one of the sensing RS pattern, the sensing task, and the sensing RS mode. In one embodiment, the method 700 includes transmitting 720, to the UE device, updated configurations defining at least one sensing reference signal ("RS") pattern, the sensing task, and the sensing RS mode based on the received suitability message, and the method 700 ends.

A first apparatus is disclosed for sensing reference signal adjustments for user equipment participation. The first apparatus may include a remote unit 105 such as a UE or a user equipment apparatus 400. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver that transmits a radio sensing capability report to a network node of a mobile wireless communication network in response to a capability indication request configuration received from the network node. In one embodiment, the transceiver receives, from the network node, configurations defining at least one sensing reference signal ("RS") pattern, a sensing task, and a sensing RS mode based on the radio sensing capability report.

In one embodiment, the first apparatus includes a processor that executes, based on the configurations, one or more of the sensing task and interference management according to the sensing RS pattern and the sensing RS mode in response to the sensing task and the interference management being scheduled, respectively.

In one embodiment, the sensing task comprises usage of the sensing RS pattern configuration by one of the configurations. In one embodiment, the mode for the sensing RS utilization comprises at least one of transmission of the defined sensing RS patterns, reception of the defined sensing RS patterns, sensing-to-communication interference control, and communication-to-sensing interference control.

In one embodiment, the sensing RS mode comprises at least one of transmission of the defined sensing RS patterns, reception of the defined sensing RS patterns, sensing-to-sensing interference control, sensing-to-communication interference control, and communication-to-sensing interference control.

In one embodiment, the radio sensing capability report comprises at least one of a set of supported sensing RS configurations for one or more of sensing RS transmissions and sensing RS receptions, a set of frequency bands that the UE supports for a sensing operation, a set of supported multiplexing types for sensing RS, a set of supported measurement types for sensing RS reception, a set of supported reporting types according to sensing measurements, and a set of capability features based on one or more of the foregoing.

In one embodiment, the radio sensing capability report further comprises at least one of the supported beams or beam configurations for sensing RS reception or for transmission or for joint transmission and reception (e.g., the information of beams (e.g., beam directions, Tx filter indices from the codebook, beam direction, and/or the like) that can be used for sensing RS transmissions, maximum number of simultaneous beams for sensing RS transmissions, and/or the like), supported Tx power for each supported beam where simultaneous transmission and reception is not taking place at the UE, supported Tx power for each supported beam where simultaneous transmission and reception is taking place at the UE, the type of the supported sensing RS measurements (e.g., the types of measurement objectives, e.g., distance or speed, in the range r1 to r2, the supported estimation methods, the maximum memory buffer, maximum computational resource, and/or the like), a set of sensing RS-defining parameters for the supported sensing RS configurations for sensing RS reception, for transmission and/or for joint transmission and reception, the maximum supported time-duration of the sensing RS for reception, for transmission, and/or for joint transmission and reception of sensing RS, the maximum supported number of REs within the sensing RS for reception, for transmission, and/or for joint transmission and reception of sensing RS, the supported sensing RS patterns along the time-domain or frequency domain or jointly via the time and frequency domain for reception, for transmission, and/or for joint transmission and reception of sensing RS, the supported mapping types for sensing RS reception, for transmission, and/or for joint transmission and reception, a maximum number of sensing RS patterns included within a time or frequency unit for transmission, for reception, and/or for joint transmission and reception or a combination thereof (e.g., co-existing within a slot or subframe or frame or within an RB or a combination thereof, this can be a different or a joint number for transmissions, receptions, joint transmission and receptions), the supported multiplexing types (e.g., maximum number of supported orthogonalization via CBG, or via harmonic phase rotations for sensing RS transmission or reception), the supported incomplete sensing RS resource pattern recovery configurations (e.g., maximum number/portion of the REs with unknown locations and/or the maximum size of the unknown search space, e.g., the number of potential pattern combinations that has to be examined), the supported incomplete sensing RS sequence recovery configurations (e.g., maximum number/portion of the REs with unknown sequence value and/or the maximum size of the unknown search space, e.g., the number of potential sequence combinations that has to be examined), the supported DFT spreading configurations (including, e.g., available DFT block sizes, the speed that they can be updated/replaced, and/or the like), the supported types of the pre-DFT filtering for multiplexing (e.g., the supported sizes and mapping types, codebook ID of supported matrices/matrix types, and/or the like), the supported types of the pre-IFFT filtering (matrices for the supported pre-IFFT filers and the supported dimension), and a set of the supported multiplexing configurations for sensing RS.

In one embodiment, the processor schedules the capability report for sensing with at least one of one or more aperiodic resources, one or more periodic resources and one or more semi-persistent resources. In one embodiment, the capability report for sensing comprises an indication of one or more capability-defining indices from a codebook, the codebook comprising possible capability information combination and features.

In one embodiment, at least one of parameters for the sensing RS pattern are defined based on at least one of parameters for the sensing RS pattern and parameters associated with the capability information of the UE (e.g., a specific sensing RS resource pattern in time domain and the capability information also indicate a specific frequency pattern, doppler, and/or range measurements requirement with a specific resolution).

In one embodiment, transceiver transmits a message to the network node indicating a suitability of a configuration for at least one of the sensing RS pattern, the sensing task, and the sensing RS mode based on a configuration for generating the suitability message and a configuration defining a set of resources for transmission of the suitability message.

In one embodiment, the processor generates the suitability message in response to one or more of reception of a sensing RS configuration, reception of a sensing RS mode, reception of a sensing task configuration, reception of at least a portion of a sensing RS, and transmission and reception of at least a portion of the sensing RS. In one embodiment, the configuration for defining the set of resources comprises definitions defining at least one of a set of time resources, a set of frequency resources, and a set of beam resources for transmission of the suitability message.

In one embodiment, the transceiver receives a new configuration for at least one of the sensing RS pattern, the sensing task, and the sensing RS mode based on the suitability indicated in the message. In one embodiment, the suitability message comprises at least one of a sensing measurement result from a portion of a received sensing RS, an indication of a portion of the sensing RS over which the suitability message is generated from, an indication that at least one of available memory, available energy, and available computational buffer violates a predefined threshold, an indication that at least a portion of a received sensing RS is below a power threshold, an indication that the received sensing RS for joint transmission and reception configuration leads to a self-interference above a predefined threshold at at least one of configured beam pairs and configured transmit power (e.g., when the joint FD transmission and reception scheme is configured for the first device), an indication that a required measurement accuracy may not be achieved, an indication of a type of the targeted measurement accuracy that may not be achieved, an indication that available cyclic prefix ("CP") overhead for at least some sensing symbols is one of above a threshold and below a threshold, a subset of a sensing RS configuration that may not be supported by the UE at time of configuration, and a recommendation of at least one of repetition and change for a subset of sensing RS configuration-defining parameters.

In one embodiment, the processor performs sensing measurements using a combination of at least a portion of a first sensing RS and a second sensing RS based on a configuration defining a joint measurement type, the first sensing RS based on a previous sensing RS configuration and the second sensing RS based on an updated sensing RS configuration (e.g., the first and second received sensing RS are jointly used to perform the measurement).

In one embodiment, the apparatus further includes, as part of a configuration for the sensing task, one or more of means for controlling interference from sensing RS pattern transmission to a communication channel and means controlling interference from the communication channel to sensing RS reception, and means controlling interference from the sensing RS transmission to sensing RS reception.

In one embodiment, the means for controlling interference from sensing RS pattern transmission to a communication channel comprises one or more of muting and power backoff for the sensing RS transmission and wherein the means controlling interference from the communication channel to sensing RS reception comprises one or more of muting and power backoff for the communication channel.

In one embodiment, the processor one or more of mutes transmission of a previously configured sensing RS within resources coinciding with an indicated sensing RS, neglects reception of a previously configured sensing RS within the resources coinciding with the indicated sensing RS, and adjusts a sequence length and mapping of the previously configured sensing RS around muted resource elements.

In one embodiment, the processor one or more of mutes transmission of at least one of a UL data channel and a UL control channel within resources coinciding with an indicated sensing RS, neglects reception of at least one of a DL data channel and a DL control channel within the resources coinciding with the indicated sensing RS, and rate matches around at least one of muted resource elements and neglected resource elements for at least one of transmission and reception of at least one of a data channel and a control channel.

In one embodiment, the transceiver receives one of a configuration and a criterion associated with the muting (e.g., if the associated data/control channel is associated with a high importance, or the sensing RS is associated with a high importance, based on some indicated parameters, or prone to an interference) and the processor one or more of mutes transmission, according to at least one of the received muting configuration and the criterion, of a previously configured sensing RS within a subset of resources coinciding with indicated sensing RS resources following a configured resource selection (e.g., only half of the resources in time domain and a quarter of the resources in the frequency domain to be muted), neglects reception of a previously configured sensing RS within muted resources, and adjusts a sequence length and mapping of the previously configured sensing RS around muted resource elements.

In one embodiment, the transceiver receives one of a configuration and a criterion associated with the muting (e.g., if the associated data/control channel is associated with a high importance, or the sensing RS is associated with a high importance, based on some indicated parameters, or prone to an interference) and the processor one or more of mutes transmission, according to at least one of the received muting configuration and the criterion, of at least one of a UL data channel and a UL control channel within a subset of resources coinciding with indicated sensing RS resources following a configured resource selection (e.g., only half of the resources in time domain and a quarter of the resources in the frequency domain to be muted), neglects reception of at least one of a DL data channel and a DL control channel within the resources coinciding with the indicated sensing RS resources, and rate matches around at least one of muted resource elements and neglected resource elements for at least one of transmission and reception of at least one of a data channel and a control channel.

In one embodiment, the sensing task comprises at least one of transmission of the sensing RS pattern, reception of the sensing RS pattern, the sensing RS transmitted by the UE, reception of the sensing RS pattern, the sensing RS transmitted by a second device, interference management according to the received sensing RS pattern, taking sensing measurements on the received sensing RS, and transmitting a sensing measurement report to a network device.

A first method is disclosed for sensing reference signal adjustments for user equipment participation. The first method may be performed by a remote unit 105 such as a UE or a user equipment apparatus 400. In some embodiments, the first method may be performed by a processor executing program code, for example, a microcontroller, a microprocessor, a CPU, a GPU, an auxiliary processing unit, a FPGA, or the like.

In one embodiment, the first method includes transmitting a radio sensing capability report to a network node of a mobile wireless communication network in response to a capability indication request configuration received from the network node. In one embodiment, the first method includes receiving, from the network node, configurations defining at least one sensing reference signal ("RS") pattern, a sensing task, and a sensing RS mode based on the radio sensing capability report.

In one embodiment, the first method includes executing, based on the configurations, one or more of the sensing task and interference management according to the sensing RS pattern and the sensing RS mode in response to the sensing task and the interference management being scheduled, respectively.

In one embodiment, the sensing task comprises usage of the sensing RS pattern configuration by one of the configurations. In one embodiment, the mode for the sensing RS utilization comprises at least one of transmission of the defined sensing RS patterns, reception of the defined sensing RS patterns, sensing-to-communication interference control, and communication-to-sensing interference control.

In one embodiment, the sensing RS mode comprises at least one of transmission of the defined sensing RS patterns, reception of the defined sensing RS patterns, sensing-to-sensing interference control, sensing-to-communication interference control, and communication-to-sensing interference control.

In one embodiment, the radio sensing capability report comprises at least one of a set of supported sensing RS configurations for one or more of sensing RS transmissions and sensing RS receptions, a set of frequency bands that the UE supports for a sensing operation, a set of supported multiplexing types for sensing RS, a set of supported measurement types for sensing RS reception, a set of supported reporting types according to sensing measurements, and a set of capability features based on one or more of the foregoing.

In one embodiment, the radio sensing capability report further comprises at least one of the supported beams or beam configurations for sensing RS reception or for transmission or for joint transmission and reception (e.g., the information of beams (e.g., beam directions, Tx filter indices from the codebook, beam direction, and/or the like) that can be used for sensing RS transmissions, maximum number of simultaneous beams for sensing RS transmissions, and/or the like), supported Tx power for each supported beam where simultaneous transmission and reception is not taking place at the UE, supported Tx power for each supported beam where simultaneous transmission and reception is taking place at the UE, the type of the supported sensing RS measurements (e.g., the types of measurement objectives, e.g., distance or speed, in the range r1 to r2, the supported estimation methods, the maximum memory buffer, maximum computational resource, and/or the like), a set of sensing RS-defining parameters for the supported sensing RS configurations for sensing RS reception, for transmission and/or for joint transmission and reception, the maximum supported time-duration of the sensing RS for reception, for transmission, and/or for joint transmission and reception of sensing RS, the maximum supported number of REs within the sensing RS for reception, for transmission, and/or for joint transmission and reception of sensing RS, the supported sensing RS patterns along the time-domain or frequency domain or jointly via the time and frequency domain for reception, for transmission, and/or for joint transmission and reception of sensing RS, the supported mapping types for sensing RS reception, for transmission, and/or for joint transmission and reception, a maximum number of sensing RS patterns included within a time or frequency unit for transmission, for reception, and/or for joint transmission and reception or a combination thereof (e.g., co-existing within a slot or subframe or frame or within an RB or a combination thereof, this can be a different or a joint number for transmissions, receptions, joint transmission and receptions), the supported multiplexing types (e.g., maximum number of supported orthogonalization via CBG, or via harmonic phase rotations for sensing RS transmission or reception), the supported incomplete sensing RS resource pattern recovery configurations (e.g., maximum number/portion of the REs with unknown locations and/or the maximum size of the unknown search space, e.g., the number of potential pattern combinations that has to be examined), the supported incomplete sensing RS sequence recovery configurations (e.g., maximum number/portion of the REs with unknown sequence value and/or the maximum size of the unknown search space, e.g., the number of potential sequence combinations that has to be examined), the supported DFT spreading configurations (including, e.g., available DFT block sizes, the speed that they can be updated/replaced, and/or the like), the supported types of the pre-DFT filtering for multiplexing (e.g., the supported sizes and mapping types, codebook ID of supported matrices/matrix types, and/or the like), the supported types of the pre-IFFT filtering (matrices for the supported pre-IFFT filers and the supported dimension), and a set of the supported multiplexing configurations for sensing RS.

In one embodiment, the first method includes scheduling the capability report for sensing with at least one of one or more aperiodic resources, one or more periodic resources and one or more semi-persistent resources. In one embodiment, the capability report for sensing comprises an indication of one or more capability-defining indices from a codebook, the codebook comprising possible capability information combination and features.

In one embodiment, at least one of parameters for the sensing RS pattern are defined based on at least one of parameters for the sensing RS pattern and parameters associated with the capability information of the UE (e.g., a specific sensing RS resource pattern in time domain and the capability information also indicate a specific frequency pattern, doppler, and/or range measurements requirement with a specific resolution).

In one embodiment, the first method includes transmitting a message to the network node indicating a suitability of a configuration for at least one of the sensing RS pattern, the sensing task, and the sensing RS mode based on a configuration for generating the suitability message and a configuration defining a set of resources for transmission of the suitability message.

In one embodiment, the first method includes generating the suitability message in response to one or more of reception of a sensing RS configuration, reception of a sensing RS mode, reception of a sensing task configuration, reception of at least a portion of a sensing RS, and transmission and reception of at least a portion of the sensing RS. In one embodiment, the configuration for defining the set of resources comprises definitions defining at least one of a set of time resources, a set of frequency resources, and a set of beam resources for transmission of the suitability message.

In one embodiment, the first method includes receiving a new configuration for at least one of the sensing RS pattern, the sensing task, and the sensing RS mode based on the suitability indicated in the message. In one embodiment, the suitability message comprises at least one of a sensing measurement result from a portion of a received sensing RS, an indication of a portion of the sensing RS over which the suitability message is generated from, an indication that at least one of available memory, available energy, and available computational buffer violates a predefined threshold, an indication that at least a portion of a received sensing RS is below a power threshold, an indication that the received sensing RS for joint transmission and reception configuration leads to a self-interference above a predefined threshold at at least one of configured beam pairs and configured transmit power (e.g., when the joint FD transmission and reception scheme is configured for the first device), an indication that a required measurement accuracy may not be achieved, an indication of a type of the targeted measurement accuracy that may not be achieved, an indication that available cyclic prefix ("CP") overhead for at least some sensing symbols is one of above a threshold and below a threshold, a subset of a sensing RS configuration that may not be supported by the UE at time of configuration, and a recommendation of at least one of repetition and change for a subset of sensing RS configuration-defining parameters.

In one embodiment, the first method includes performing sensing measurements using a combination of at least a portion of a first sensing RS and a second sensing RS based on a configuration defining a joint measurement type, the first sensing RS based on a previous sensing RS configuration and the second sensing RS based on an updated sensing RS configuration (e.g., the first and second received sensing RS are jointly used to perform the measurement).

In one embodiment, the first method includes, as part of a configuration for the sensing task, one or more of means for controlling interference from sensing RS pattern transmission to a communication channel and means controlling interference from the communication channel to sensing RS reception, and means controlling interference from the sensing RS transmission to sensing RS reception.

In one embodiment, the means for controlling interference from sensing RS pattern transmission to a communication channel comprises one or more of muting and power backoff for the sensing RS transmission and wherein the means controlling interference from the communication channel to sensing RS reception comprises one or more of muting and power backoff for the communication channel.

In one embodiment, the first method includes one or more of muting transmission of a previously configured sensing RS within resources coinciding with an indicated sensing RS, neglecting reception of a previously configured sensing RS within the resources coinciding with the indicated sensing RS, and adjusting a sequence length and mapping of the previously configured sensing RS around muted resource elements.

In one embodiment, the first method includes one or more of muting transmission of at least one of a UL data channel and a UL control channel within resources coinciding with an indicated sensing RS, neglecting reception of at least one of a DL data channel and a DL control channel within the resources coinciding with the indicated sensing RS, and rate matching around at least one of muted resource elements and neglected resource elements for at least one of transmission and reception of at least one of a data channel and a control channel.

In one embodiment, the first method includes receiving one of a configuration and a criterion associated with the muting (e.g., if the associated data/control channel is associated with a high importance, or the sensing RS is associated with a high importance, based on some indicated parameters, or prone to an interference), muting transmission, according to at least one of the received muting configuration and the criterion, of a previously configured sensing RS within a subset of resources coinciding with indicated sensing RS resources following a configured resource selection (e.g., only half of the resources in time domain and a quarter of the resources in the frequency domain to be muted), neglecting reception of a previously configured sensing RS within muted resources, and adjusting a sequence length and mapping of the previously configured sensing RS around muted resource elements.

In one embodiment, the first method includes receiving one of a configuration and a criterion associated with the muting (e.g., if the associated data/control channel is associated with a high importance, or the sensing RS is associated with a high importance, based on some indicated parameters, or prone to an interference), muting transmission, according to at least one of the received muting configuration and the criterion, of at least one of a UL data channel and a UL control channel within a subset of resources coinciding with indicated sensing RS resources following a configured resource selection (e.g., only half of the resources in time domain and a quarter of the resources in the frequency domain to be muted), neglecting reception of at least one of a DL data channel and a DL control channel within the resources coinciding with the indicated sensing RS resources, and rate matching around at least one of muted resource elements and neglected resource elements for at least one of transmission and reception of at least one of a data channel and a control channel.

In one embodiment, the sensing task comprises at least one of transmission of the sensing RS pattern, reception of the sensing RS pattern, the sensing RS transmitted by the UE, reception of the sensing RS pattern, the sensing RS transmitted by a second device, interference management according to the received sensing RS pattern, taking sensing measurements on the received sensing RS, and transmitting a sensing measurement report to a network device.

A second apparatus is disclosed for sensing reference signal adjustments for user equipment participation. The second apparatus may include a network entity such as a base node, a gNB, and/or the network equipment apparatus 500. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that receives a radio sensing capability report from a user equipment ("UE") device in response to a capability indication request configuration, transmits, to the UE device, configurations defining at least one sensing reference signal ("RS") pattern, a sensing task, and a sensing RS mode based on the radio sensing capability report, receives, from the UE device, a suitability message indicating a suitability of a configuration for at least one of the sensing RS pattern, the sensing task, and the sensing RS mode, and transmits, to the UE device, updated configurations defining at least one sensing reference signal ("RS") pattern, the sensing task, and the sensing RS mode based on the received suitability message.

A second method is disclosed for sensing reference signal adjustments for user equipment participation. The second method may be performed by a network entity such as a base node, a gNB, and/or the network equipment apparatus 500. In some embodiments, the second method may be performed by a processor executing program code, for example, a microcontroller, a microprocessor, a CPU, a GPU, an auxiliary processing unit, a FPGA, or the like.

In one embodiment, the second method includes receiving a radio sensing capability report from a user equipment ("UE") device in response to a capability indication request configuration, transmitting, to the UE device, configurations defining at least one sensing reference signal ("RS") pattern, a sensing task, and a sensing RS mode based on the radio sensing capability report, receiving, from the UE device, a suitability message indicating a suitability of a configuration for at least one of the sensing RS pattern, the sensing task, and the sensing RS mode, and transmitting, to the UE device, updated configurations defining at least one sensing reference signal ("RS") pattern, the sensing task, and the sensing RS mode based on the received suitability message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
   at least one memory; and
   at least one processor coupled with the at least one memory and configured to cause the UE to:
   transmit a radio sensing capability report to a network node in response to a configuration for capability indication received from the network node, wherein the radio sensing capability report comprises an indication of capability-defining indices from a codebook, the codebook comprising possible capability information combinations and features;
   receive, from the network node, at least one configuration defining a sensing reference signal ("RS") pattern, a sensing task, a sensing RS mode, or a combination thereof, based on the radio sensing capability report; and
   execute, based on the at least one configuration, the sensing task, interference management, or a combination thereof, according to the sensing RS pattern and the sensing RS mode in response to the sensing task and the interference management being scheduled.

2. The UE of claim 1, wherein the sensing RS mode comprises at least one of transmission of the sensing RS patterns, reception of the sensing RS patterns, sensing-to-sensing interference control, sensing-to-communication interference control, and communication-to-sensing interference control.

3. The UE of claim 1, wherein the radio sensing capability report comprises at least one of:
   a set of supported sensing RS configurations for one or more of sensing RS transmissions and sensing RS receptions;
   a set of frequency bands that the UE supports for a sensing operation;
   a set of supported multiplexing types for sensing RS;
   a set of supported measurement types for sensing RS reception;
   a set of supported reporting types according to sensing measurements; or
   a set of capability features based on one or more of the set of supported sensing RS configurations, the set of frequency bands, the set of supported multiplexing types, the set of supported measurement types, or the set of supported reporting types.

4. The UE of claim 1, wherein the at least one processor is configured to cause the UE to schedule the radio sensing capability report for sensing with at least one of one or more aperiodic resources, one or more periodic resources or one or more semi-persistent resources.

5. The UE of claim 1, wherein at least one of parameters for the sensing RS pattern are defined based on at least one of parameters for the sensing RS pattern and parameters associated with the possible capability information combinations and features of the UE.

6. The UE of claim 1, wherein the at least one processor is configured to cause the UE to transmit a message to the network node indicating a suitability of a configuration for at least one of the sensing RS pattern, the sensing task, and the sensing RS mode based on a configuration for generating the suitability message and a configuration defining a set of resources for transmission of the suitability message.

7. The UE of claim 6, wherein:
the at least one processor is configured to cause the UE to generate the suitability message in response to one or more of reception of a sensing RS configuration, reception of a sensing RS mode, reception of a sensing task configuration, reception of at least a portion of a sensing RS, and transmission and reception of at least a portion of the sensing RS; and
the configuration for defining the set of resources comprises definitions defining at least one of a set of time resources, a set of frequency resources, and a set of beam resources for transmission of the suitability message.

8. The UE of claim 6, wherein the at least one processor is configured to cause the UE to receive a new configuration for at least one of the sensing RS pattern, the sensing task, and the sensing RS mode based on the suitability indicated in the message.

9. The UE of claim 6, wherein the suitability message comprises at least one of:
a sensing measurement result from a portion of a received sensing RS;
an indication of the portion of the received sensing RS over which the suitability message is generated from;
an indication that at least one of available memory, available energy, and available computational buffer violates a predefined threshold;
an indication that at least a portion of the received sensing RS is below a power threshold;
an indication that the received sensing RS for joint transmission and reception configuration leads to a self-interference above a predefined threshold for at least one of configured beam pairs and configured transmit power;
an indication that a required measurement accuracy may not be achieved;
an indication of a type of targeted measurement accuracy that may not be achieved;
an indication that available cyclic prefix ("CP") overhead for at least some sensing symbols is one of above a threshold and below a threshold;
a subset of a sensing RS configuration that may not be supported by the UE at time of configuration; and
a recommendation of at least one of repetition and change for a subset of sensing RS configuration-defining parameters.

10. The UE of claim 6, wherein the at least one processor is configured to cause the UE to perform sensing measurements using a combination of at least a portion of a first sensing RS and a second sensing RS based on a configuration defining a joint measurement type, the first sensing RS based on a previous sensing RS configuration and the second sensing RS based on an updated sensing RS configuration.

11. The UE of claim 1, further comprising, as part of a configuration for the sensing task, one or more of means for controlling interference from a sensing RS pattern transmission to a communication channel and means controlling interference from the communication channel to sensing RS reception, and means controlling interference from the sensing RS transmission to sensing RS reception.

12. The UE of claim 11, wherein the means for controlling interference from sensing RS pattern transmission to a communication channel comprises one or more of muting and power backoff for the sensing RS transmission and wherein the means controlling interference from the communication channel to sensing RS reception comprises one or more of muting and power backoff for the communication channel.

13. The UE of claim 12, wherein the at least one processor is configured to cause the UE to:
mute transmission of a previously configured sensing RS within resources coinciding with an indicated sensing RS;
neglect reception of a previously configured sensing RS within the resources coinciding with the indicated sensing RS;
adjust a sequence length and mapping of the previously configured sensing RS around muted resource elements,
or a combination thereof.

14. The UE of claim 12, wherein the at least one processor is configured to cause the UE to:
mute transmission of at least one of a UL data channel and a UL control channel within resources coinciding with an indicated sensing RS;
neglect reception of at least one of a DL data channel and a DL control channel within the resources coinciding with the indicated sensing RS;
rate matches around at least one of muted resource elements and neglected resource elements for at least one of transmission and reception of at least one of a data channel and a control channel,
or a combination thereof.

15. The UE of claim 12, wherein the at least one processor is configured to cause the UE to receive one of a configuration and a criterion associated with the muting and:
mute transmission, according to at least one of the configuration and the criterion associated with the muting, of a previously configured sensing RS within a subset of resources coinciding with indicated sensing RS resources following a configured resource selection;
neglect reception of a previously configured sensing RS within muted resources;
adjust a sequence length and mapping of the previously configured sensing RS around muted resource elements,
or a combination thereof.

16. The UE of claim 13, wherein the at least one processor is configured to cause the UE to receive one of a configuration and a criterion associated with the muting and:
mute transmission, according to at least one of the configuration and the criterion associated with the muting, of at least one of a UL data channel and a UL control channel within a subset of resources coinciding with indicated sensing RS resources following a configured resource selection;
neglect reception of at least one of a DL data channel and a DL control channel within the resources coinciding with the indicated sensing RS resources;

rate matches around at least one of muted resource elements and neglected resource elements for at least one of transmission and reception of at least one of a data channel and a control channel, or a combination thereof.

17. The UE of claim 1, wherein the sensing task comprises at least one of:
   transmission of the sensing RS pattern;
   reception of the sensing RS pattern, the sensing RS transmitted by the UE;
   reception of the sensing RS pattern, the sensing RS transmitted by a second device;
   interference management according to the received sensing RS pattern;
   taking sensing measurements on the received sensing RS; and
   transmitting a sensing measurement report to a network device.

18. A network equipment (NE) for wireless communication, comprising:
   at least one memory; and
   at least one processor coupled with the at least one memory and configured to cause the NE to:
      receive a radio sensing capability report from a user equipment ("UE") in response to a configuration for capability indication;
      transmit, to the UE, at least one configuration defining a sensing reference signal ("RS") pattern, a sensing task, a sensing RS mode, or a combination thereof, based on the radio sensing capability report;
      receive, from the UE, a suitability message indicating a suitability of a configuration for the sensing RS pattern, the sensing task, and the sensing RS mode, or a combination thereof; and
      transmit, to the UE, at least one updated configuration defining the sensing pattern, the sensing task, the sensing RS mode, or combination thereof, based on the received suitability message.

19. A method performed by a user equipment ("UE"), the method comprising:
   transmitting a radio sensing capability report to a network node in response to a configuration for capability indication received from the network node, wherein the radio sensing capability report comprises an indication of capability-defining indices from a codebook, the codebook comprising possible capability information combinations and features;
   receiving, from the network node, at least one configuration defining a sensing reference signal ("RS") pattern, a sensing task, a sensing RS mode, or a combination thereof, based on the radio sensing capability report; and
   executing, based on the at least one configuration, the sensing task, interference management, or a combination thereof, according to the sensing RS pattern and the sensing RS mode in response to the sensing task and the interference management being scheduled.

* * * * *